United States Patent
Morris et al.

(10) Patent No.: US 9,651,813 B2
(45) Date of Patent: May 16, 2017

(54) LIQUID CRYSTAL PAPER

(71) Applicants: Hunter Morris, Kent, OH (US); Albert Green, Kent, OH (US)

(72) Inventors: Hunter Morris, Kent, OH (US); Albert Green, Kent, OH (US)

(73) Assignee: Kent Displays Inc., Kent, OH (US)

( * ) Notice: Subject to any disclaimer, the term of this patent is extended or adjusted under 35 U.S.C. 154(b) by 1038 days.

(21) Appl. No.: 13/621,367

(22) Filed: Sep. 17, 2012

(65) Prior Publication Data
US 2013/0070184 A1    Mar. 21, 2013

Related U.S. Application Data

(60) Provisional application No. 61/535,536, filed on Sep. 16, 2011.

(51) Int. Cl.
*G02F 1/1333* (2006.01)
*G02F 1/137* (2006.01)
*G02F 1/13* (2006.01)

(52) U.S. Cl.
CPC ...... *G02F 1/13338* (2013.01); *G02F 1/13718* (2013.01); *G02F 1/132* (2013.01); *G02F 1/1313* (2013.01); *G02F 1/133305* (2013.01)

(58) Field of Classification Search
CPC .... G02F 1/13338; G02F 1/1313; G02F 1/132; G02F 1/133305; G02F 1/13718; G02F 1/13452; G09F 9/301
USPC ............. 349/12, 58, 158; 345/173, 174
See application file for complete search history.

(56) References Cited

U.S. PATENT DOCUMENTS

| | | | |
|---|---|---|---|
| 4,685,771 | A | 8/1987 | West et al. |
| 5,347,811 | A | 9/1994 | Hasegawa et al. |
| 5,453,863 | A | 9/1995 | West et al. |
| 5,493,430 | A | 2/1996 | Lu et al. |
| 5,644,330 | A | 7/1997 | Catchpole et al. |

(Continued)

FOREIGN PATENT DOCUMENTS

WO    2005081779    9/2005

OTHER PUBLICATIONS

J.William Doane and Asad Khan, Cholesteric Liquid Crystals for Flexible Displays, Flexible Flat Panel Displays, 331-354, 2005, John Wiley & Sons, Ltd.

(Continued)

*Primary Examiner* — Edward Glick
*Assistant Examiner* — David Chung
(74) *Attorney, Agent, or Firm* — Abel Law Group, LLP

(57) ABSTRACT

Disclosed is liquid crystal paper and an erasing device that is not permanently connected to the liquid crystal paper. A sheet of liquid crystal paper includes flexible polymeric substrates. A polymer network or a spacer network, in which bistable cholesteric reflective liquid crystal material is dispersed, is disposed between two of the substrates. Optional alignment layers or optional electrically conductive layers sandwich the liquid crystal material therebetween. An optional layer of light absorbing material is disposed near one of the substrates. Application of pressure to an upper substrate changes a focal conic nonreflective texture of the liquid crystal material to a reflective planar texture. The erasing device applies a voltage or heat for erasing the paper by changing the reflective planar texture to the focal conic nonreflective texture.

29 Claims, 5 Drawing Sheets

(56) References Cited

U.S. PATENT DOCUMENTS

| | | | |
|---|---|---|---|
| 5,691,795 A | 11/1997 | Doane et al. | |
| 5,748,277 A | 5/1998 | Huang et al. | |
| 5,831,816 A * | 11/1998 | Johns | F16M 11/10 349/60 |
| 5,933,203 A | 8/1999 | Wu et al. | |
| 6,104,448 A | 8/2000 | Doane et al. | |
| 6,133,895 A | 10/2000 | Huang | |
| 6,154,190 A | 11/2000 | Yang et al. | |
| 6,268,839 B1 | 7/2001 | Yang et al. | |
| 6,269,225 B1 * | 7/2001 | Sato | G02F 1/133348 349/1 |
| 6,359,673 B1 | 3/2002 | Stephenson | |
| 6,377,321 B1 | 4/2002 | Khan et al. | |
| 6,476,885 B1 * | 11/2002 | Murray | G02F 1/13452 349/150 |
| 6,654,080 B1 | 11/2003 | Khan et al. | |
| 6,752,430 B2 | 6/2004 | Holt et al. | |
| 6,788,362 B2 | 9/2004 | Stephenson et al. | |
| 6,788,363 B2 | 9/2004 | Liu et al. | |
| 6,816,138 B2 | 11/2004 | Huang et al. | |
| 6,833,885 B2 | 12/2004 | Hisamitsu et al. | |
| 6,934,792 B1 | 8/2005 | Nakazawa | |
| 7,061,559 B2 | 6/2006 | Khan et al. | |
| 7,075,593 B2 | 7/2006 | Vidal et al. | |
| 7,142,190 B2 | 11/2006 | Martinez | |
| 7,170,481 B2 | 1/2007 | Doane et al. | |
| 7,188,996 B2 | 3/2007 | Parker | |
| 7,236,151 B2 | 6/2007 | Doane et al. | |
| 7,351,506 B2 | 4/2008 | Schneider et al. | |
| 7,362,485 B2 * | 4/2008 | Yamaguchi | G02F 1/1345 349/139 |
| 7,479,940 B2 | 1/2009 | Marhefka | |
| 7,755,610 B2 * | 7/2010 | Capurso | G09F 9/30 345/173 |
| 8,310,630 B2 | 11/2012 | Marhefka et al. | |
| 2002/0109802 A1 * | 8/2002 | Cheng | H04M 1/0266 349/58 |
| 2003/0160741 A1 | 8/2003 | Martinez | |
| 2005/0078245 A1 * | 4/2005 | Sasaki | G02B 5/3016 349/117 |
| 2005/0259197 A1 * | 11/2005 | Hirai | G02F 1/134309 349/113 |
| 2007/0085837 A1 * | 4/2007 | Ricks | G02F 1/13338 345/173 |
| 2007/0126674 A1 | 6/2007 | Doane et al. | |
| 2007/0152928 A1 | 7/2007 | Doane et al. | |
| 2007/0277659 A1 * | 12/2007 | Schneider | B23K 26/40 83/73 |
| 2008/0074383 A1 | 3/2008 | Dean | |
| 2009/0033811 A1 | 2/2009 | Schneider | |
| 2009/0096942 A1 | 4/2009 | Schneider et al. | |
| 2009/0284691 A1 * | 11/2009 | Marhefka | G02F 1/1347 349/86 |
| 2010/0216635 A1 | 8/2010 | Kazmaier et al. | |
| 2010/0256802 A1 * | 10/2010 | Garica | G01R 31/01 700/218 |
| 2012/0099030 A1 | 4/2012 | Pishnyak | |
| 2013/0342432 A1 * | 12/2013 | Schneider | G09G 3/3493 345/89 |
| 2015/0054775 A1 * | 2/2015 | Montbach | G02F 1/13718 345/174 |

OTHER PUBLICATIONS

J.Y. Nahm, et al. Amorphous Silicon Thin-Film Transistor Active-Matrix Reflective Cholesteric Liquid Crystal Display, Asia Display 98: 979-982.

Brochure of a Skin Flik™ electronic skin product published in the U.S. after May 22, 2011.

Description of a Skin Flik™ electronic skin product sold in the U.S. after May 22, 2011.

E. Montbach, et al., Flexible Electronic Skin Display, SID Symposium Digest of Technical Papers, 2009, vol. 40, p. 16.

U.S. Appl. No. 12/729,678, filed Mar. 23, 2010, entitled Display With Overlayed Electronic Skin , Inventor Asad Khan.

* cited by examiner

LIQUID CRYSTAL PAPER

TECHNICAL FIELD

This disclosure features liquid crystal paper in combination with an erasing device for erasing the liquid crystal paper that is not permanently attached to the liquid crystal paper.

BACKGROUND

We are accustomed to reading and writing or drawing on paper. Paper is convenient and is readily available but it can only be used once; after use, it is promptly discarded. Discarding paper is a huge problem world-wide at a significant cost and impact on the environment. Recycling it has been a growing business. Using more modern technology, brought on by computers with touch screens and powerful software, we can write on computer screens and the image can be saved or discarded without waste. An example is the iPad® of Apple Inc. However, we have not had the privilege of something that truly imitates paper but does not need to be discarded after use.

Photochromic paper has been disclosed for paper replacement that can be erased and reused; see for example, U.S. Patent Application Publication 2010/0216635 by Xerox. A problem with photochromic paper, however, is that the image is transient, being erased by ambient and sun light. It also requires a special optical stylus or masked light to create an image.

U.S. Pat. No. 6,104,448 discloses a thin film of cholesteric liquid crystal material sandwiched between two thin sheets of plastic used as a writing surface. The light pressure of a pointed stylus such as a pencil can be used to write or draw an image on the tablet. A unique feature of the tablet is that the image remains indefinitely under sun and ambient light and even elevated temperatures which can exceed 50° C. With transparent electrodes on the plastic substrates and attached drive electronics, the image traced on the writing pad can be written and electrically erased and rewritten with a different image. A writing pad including a cholesteric liquid crystal layer sandwiched between substrates and in contact with electrodes, which is erased by attached drive electronics, has been recently commercialized under the name Boogie Board™ by Kent Displays, Inc.

More recently, full-color writing tablets have been proposed (see U.S. Patent Application Publications 2009/0033811 and 2009/0096942), which are incorporated herein by reference in their entireties. The patent applications disclose, among other things, writing pads in which two or more cholesteric liquid crystal layers that reflect different primary colors are stacked on top of one another. With a stylus one can draw or write in a different primary color. Colors are changed using attached drive electronics. The primary colors can be mixed depending upon the pressure of the pen to create many different colors. This provides the user of a writing pad to create artwork in full color.

As disclosed in U.S. Pat. No. 6,104,448 polymer networks can be incorporated into the cholesteric liquid crystal layer. U.S. Patent Application Publication 2009/0033811 further discloses how the polymer networks can be used to control the pressure sensitivity of the stylus in tracing an image. Published U.S. patent application Pub No. 2012/0099030, which is incorporated herein by reference in its entirety, discloses the use of a spacer network where the density and placement of the spacers control the pressure sensitivity.

BRIEF DESCRIPTION OF THE INVENTION

A liquid crystal paper of this disclosure has similar properties as normal writing paper but, unlike paper, does not need to be discarded after use; it can be cleared and reused many times over. To imitate actual wood pulp-based paper (normal writing paper) the liquid crystal paper must by thin, flexible, light weight, devoid of electronics and software and able to be written on with an untethered stylus. Like normal writing paper, liquid crystal paper is a thin, flexible sheet that has no electronic circuitry permanently attached. One uses liquid crystal paper in the same way normal writing paper is used for hand writing or drawing pictures. An untethered, pointed stylus is used to write on the liquid crystal paper but with the advantage that it does not have to be a pencil or pen but only a pointed object which could even be ones finger nail. Like normal writing paper, liquid crystal paper is placed on a hard surface for writing. The paper can also be designed to go into a mechanical printer that uses raised type to type documents from the paper. Another advantage over normal writing paper is that water does not damage the liquid crystal paper. It is more rugged and not so easily wrinkled or torn.

After use, the liquid crystal paper can be cleared or erased for reuse. This can be accomplished by several different mechanisms:

A liquid crystal material that can be cleared by application of heat is used in the liquid crystal paper. Using an optional liquid crystal alignment layer on the surface of the substrate the paper clears (i.e., erases) when exposed to heat. A sheet is therefore cleared by inserting it into a device that applies heat momentarily to the sheet until it clears or erases. In some cases the alignment layer is not necessary when the function of the alignment layer is served by other means to be described later.

Using a stand-alone device with electronics that provide a voltage pulse or pulses to electrodes on a sheet of liquid crystal paper will clear it. A sheet that needs to be cleared is inserted in or attached to the device that applies a voltage pulse or pulses to the electrodes of sufficient magnitude to clear the sheet.

In the case of mechanisms 1 and 2 above, multiple sheets can be cleared whereby they are inserted sequentially in an automatic fashion into one of the devices described above.

Cholesteric liquid crystalline materials are ideally suited for replacement of typical paper because of their unique optical features. When cast as a film the cholesteric material can be mechanically or electrically switched to either one of two stable textures: a visible reflective texture (planar texture) or non-visible texture (focal conic texture) that is not reflective as described, for example, in U.S. Pat. No. 5,453,863, which is incorporated herein by reference in its entirety. In the reflective texture, the material reflects light at a pre-selected wavelength and band width depending upon the material selected. In the non-reflective texture it does not reflect light and light passes through the material. On a black background the reflective texture appears as a brilliant color and the non-reflective texture appears black. Both textures are stable. These bistable structures can be electronically or mechanically switched between each other at rapid rates (on the order of milliseconds). The image can be in gray scale in which the texture of the liquid crystal includes a combination of the focal conic and planar textures that provides a reflective brightness or intensity between that produced by the planar only and focal conic only textures.

Liquid crystal paper is made by sandwiching the liquid crystal material between two substrates that are spaced to a particular gap. The substrates can be thin plastic sheets which carry transparent electrodes facing the liquid crystal. The electrodes can be unpatterned or patterned but are ideally unpatterned so as to cover the entire writing surface. The bottom substrate is painted with a light absorbing (black or colored) back layer. Alternatively, for example, one of the electrodes can be light absorbing. The cell gap is usually set by plastic spacers that are either cylindrical or spherical in shape. Other ways of setting the cell gap that are apparent to those skilled in the art in view of this disclosure may be used. However, when one presses on the top substrate, the liquid crystal is displaced; flowing laterally out of the area. When the non-reflective liquid crystal is induced to flow such as under the pressure of a pointed stylus the reflective texture is induced under the tip of the stylus. The reflective texture contrasts well with the dark background. The U.S. Pat. No. 6,104,448 patent, which is incorporated herein by reference in its entirety, discloses a polymer network that is soluble with the chiral nematic liquid crystal and phase separates to form separated polymer domains that control the flow. Alternatively, the 2012/0099030 publication discloses the use of a spacer network that may be used in the liquid crystal paper where the density and placement of the spacers control the flow.

Pressure with a stylus draws a monochromatic color image which is the reflective color of the cholesteric planar texture on a black or contrasting color background. The image is erased by applying a voltage pulse from the erasing device to electrodes on the liquid crystal paper, which drives the entire cell to the non-reflective or black state (the focal conic texture).

Referring now to various aspects of this disclosure, a first aspect features liquid crystal paper in combination with a separate erasing device for erasing the liquid crystal paper. A sheet of liquid crystal paper comprises flexible polymeric substrates. A polymer network or spacer network is used in which bistable cholesteric reflective liquid crystal material is dispersed; this is disposed between two of the substrates. Optional alignment layers or optional electrically conductive layers sandwich the liquid crystal material therebetween. The alignment layers favor formation of a focal conic nonreflective texture in the liquid crystal material but are not necessary if the surface of the bare substrate is sufficient to form the focal conic nonreflective texture alone. Application of pressure to an upper substrate changes the focal conic nonreflective texture of the liquid crystal material to a reflective planar texture. An erasing device for erasing the liquid crystal paper is not permanently connected to the liquid crystal paper. The erasing device includes a source of voltage or a source of heat for erasing the liquid crystal paper by changing the reflective planar texture to the focal conic nonreflective texture.

Referring to specific features that are applicable to all aspects of this disclosure, a layer of light absorbing material can be disposed near one of the substrates. All of the substrates that are upstream of the light absorbing layer in a direction of incident light can be transparent. The polymer network in which the liquid crystal material is dispersed can be in the form of a liquid crystal layer. At least two of the liquid crystal layers can be used. Each of the liquid crystal layers can be sandwiched by the electrically conductive layers. At least one of the substrates can be disposed between adjacent electrically conductive layers. The liquid crystal layer can have a thickness ranging from 2 to 10 microns. Each substrate can have a thickness ranging from 12.5 µm to 200 µm. Application of pressure to the upper substrate can create gray scale caused by a presence of a combination of the focal conic nonreflective texture and the reflective planar texture. A stylus that applies the pressure can be untethered to the liquid crystal paper or to the erasing device, the stylus containing no lead or ink.

A second aspect of the disclosure features liquid crystal paper in combination with a separate erasing device for electrically erasing the liquid crystal paper. A sheet of liquid crystal paper comprises flexible polymeric substrates. A polymer network or a spacer network is used in which bistable cholesteric reflective liquid crystal material is dispersed; this is disposed between two of the substrates. Electrically conductive layers sandwich the liquid crystal material therebetween. A layer of light absorbing material is disposed near one of the substrates. Electrically conductive leads extend from the electrically conductive layers so as to be exposed exterior to the substrates. Application of pressure to an upper substrate changes a focal conic nonreflective texture of the liquid crystal material to a reflective planar texture. An erasing device that erases the liquid crystal paper is not permanently connected to the liquid crystal paper. The erasing device comprises a housing including electrical contacts that detachably connect with the electrically conductive leads. Drive electronics apply a voltage to the contacts for erasing the liquid crystal paper by changing the reflective planar texture to the focal conic nonreflective texture.

Referring to specific features of the second aspect of this disclosure, the specific features discussed above in connection with the first aspect, may be used with the second aspect in any combination. The erasing device can include a switch enabling the voltage from the drive electronics to be applied to the contacts and to erase the liquid crystal paper. The erasing device can include sockets in which the contacts are disposed. The sockets are configured and arranged to receive the leads. Application of pressure to the upper substrate can create gray scale caused by a presence of a combination of the focal conic nonreflective texture and the reflective planar texture. There can be a plurality of the sheets of the liquid crystal paper and a document feeder that feeds individual sheets to the erasing device. A casing in contact with the substrates can ruggedize the liquid crystal paper.

A third aspect of this disclosure features liquid crystal paper in combination with a separate erasing device for erasing the liquid crystal paper with heat. A sheet of liquid crystal paper comprises flexible polymeric substrates. A polymer network in which bistable cholesteric reflective liquid crystal material is dispersed, is disposed between two of the substrates. Alternatively, a spacer network may be used in place of the polymer network as described in the 2012/0099030 publication. Optional alignment layers sandwich the liquid crystal material therebetween in cases where the surface of the polymer is not suitable for forming the non-reflective focal conic texture. The alignment layers favor formation of a focal conic nonreflective texture in the liquid crystal material when necessary A layer of light absorbing material is disposed near one of the substrates. Application of pressure to an upper substrate changes the focal conic nonreflective texture of the liquid crystal material to a reflective planar texture. An erasing device is used for erasing the liquid crystal paper that is not permanently connected to the liquid crystal paper. The erasing device applies heat effective to cause the liquid crystal material to reach a clearing temperature such that after the liquid paper cools it returns to the focal conic nonreflective texture.

Some of the specific features discussed above in connection with the first and second aspects may be used in connection with this aspect of the disclosure. In addition, the specific features discussed in the Detailed Description may be used in the aspects of the disclosure discussed above in any combination.

Many additional features, advantages and a fuller understanding of the invention will be had from the accompanying drawings and the detailed description that follows. It should be understood that the above Brief Description of the Invention describes the invention in broad terms while the following Detailed Description describes the invention more narrowly and presents preferred embodiments that should not be construed as necessary limitations of the broad invention as defined in the claims.

DETAILED DESCRIPTION

Figure 1:
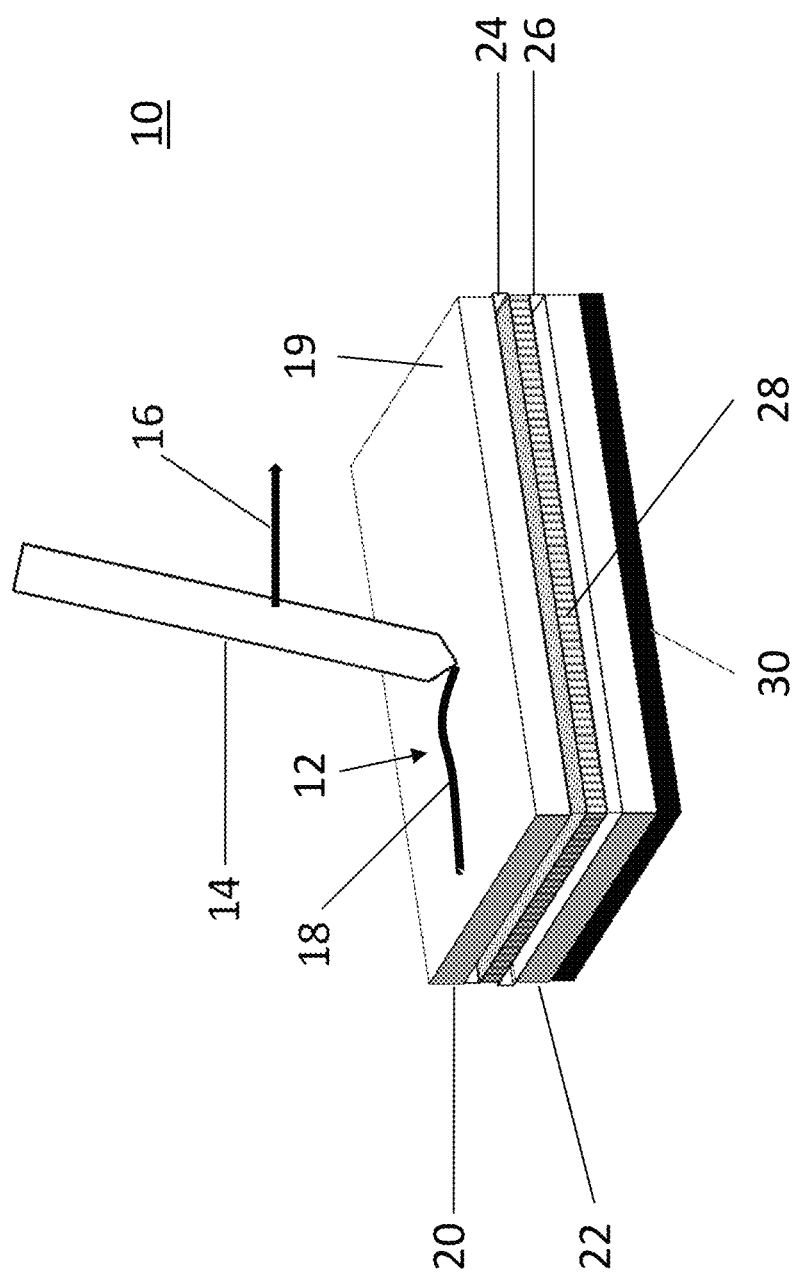
FIG. 1: Illustration of liquid crystal paper that can be thermally erased.

A first embodiment of liquid crystal paper 10 is illustrated in FIG. 1. In that embodiment the liquid crystal paper 10 is addressed with an image 12 using a pointed stylus 14 moving in a direction indicated by the arrow 16. That is, the image 12 is drawn onto the liquid crystal paper using the stylus 14 that leaves no marks on the top outer surface of the liquid crystal paper that it contacts. The stylus 14 contains no lead or ink. Rather, the image 12 (comprised of line 18 on background 19) is formed by flow of liquid crystal material induced by pressure of the stylus 14 causing the liquid crystal material to change from the nonreflective focal conic texture to the reflective planar texture in regions or lines 18 where the stylus has pressed on the liquid crystal paper. The image can be erased when the liquid crystal paper 10 is momentarily exposed to heat.

The liquid crystal paper 10 includes two transparent plastic or otherwise flexible upper and lower substrates 20 and 22. Examples of materials for the substrates 20, 22 include polyethylene terephthalate, PET, or polycarbonate polymer sheet material. Substrate sheet thicknesses in a range of 12.5 μm to 200 μm can be used but the substrate is not necessarily restricted to this range of thickness. The substrates 20, 22 may optionally be coated with a surface treatment of alignment layer materials 24 and 26 that sandwich a liquid crystal layer 28 of cholesteric liquid crystal material, which includes cholesteric liquid crystal dispersed in a polymer network or spacer network (disclosed in the 2012/0099030 publication). This surface treatment is applied to cause the cholesteric liquid crystal in the polymer dispersion of the liquid crystal layer 28 to favor the non-reflective texture upon application of heat sufficient to untwist the cholesteric liquid crystal or drive the liquid crystal to the isotropic state. Upon cooling, the liquid crystal phase is established. The surface treatment may be replaced by the polymer network as the polymer network may provide a suitable polymer coating on the surface. In cases where a spacer network is used in place of the polymer network, a surface treatment may be used when the bare surface of the substrate is not suitable for forming the non-reflective focal conic texture. In all embodiments herein, in the spacer network the density and placement of the spacers control the flow of the liquid crystal material. The polymer network can include spacers to control the cell gap, at a lower concentration than in the spacer network, and is not a network of spacers to control liquid crystal flow.

There are many surface treatments that favor the non-reflective focal conic state as described in U.S. Pat. No. 5,453,863, which is incorporated herein by reference in its entirety. The alignment layer materials are generally known in the art of liquid crystal displays to cause the long axis of the liquid crystal molecules to align perpendicular to the surface or at an angle that favors the non-reflective (focal conic) texture. Normally the alignment material is a polymer that is polymerized and phase separated from the cholesteric liquid crystal as described next. The cholesteric liquid crystal dispersion of the liquid crystal layer 28 is a material as described for example in U.S. Pat. No. 6,104,448 or more recently in U.S. Patent Application Publications 2009/0033811 and 2009/0096942, which are incorporated herein by reference in their entireties. In this material the cholesteric liquid crystal is dispersed in a polymer network created by polymerization induced phase separation, which is a well-known procedure (see for example U.S. Pat. No. 6,104,448). The phase separated polymer will also form a thin layer on the surface of the substrate to form the alignment layers 24 and 26. Alternatively, alignment layer coatings can be used for alignment layers 24 and 26 as is well known in the art of liquid crystal displays (see U.S. Pat. No. 5,453,863). The thickness of the polymer dispersed cholesteric liquid crystal material is typically about 4 microns but can be in the range of 2-10 microns. In the polymer network, the uniformity of the liquid crystal layer thickness is established by plastic or glass spacers, which is also a well-known art in the liquid crystal display technology. A light absorbing layer 30 (e.g., typically a black layer) is coated on the back of the lower substrate 22 to absorb light that is not reflected by the liquid crystal, providing contrast to the reflected image. In this embodiment, the liquid crystal paper 10 is erased by momentarily heating it to a temperature that melts the liquid crystal into a normal liquid called the clearing temperature in the art of liquid crystalline materials. When the liquid crystal paper cools, the liquid crystal returns to the non-reflective texture removing the image.

Figure 2:
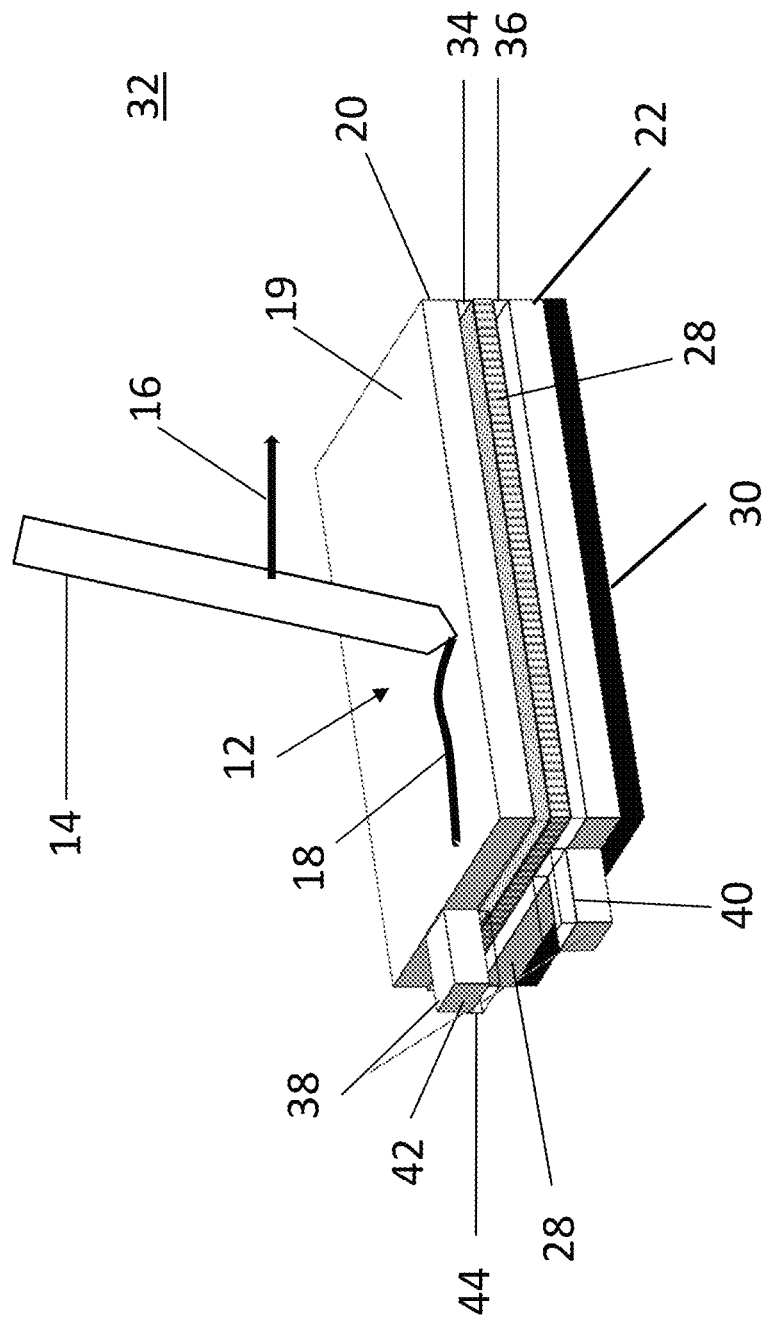
FIG. 2: Illustration of liquid crystal paper that can be electronically erased.

A second embodiment of liquid crystal paper 32 is shown in FIG. 2. The liquid crystal paper 32 is addressed with an image 12 (comprised of the line 18 on background 19) using the untethered pointed stylus 14 moving in a direction indicated by the arrow 16 (as in the first embodiment). The liquid crystal paper 32 includes two transparent plastic or otherwise flexible substrates 20 and 22, the same as described in the embodiment above. The substrates are coated with a transparent electrically conductive material 34 and 36 to serve as electrodes used for clearing the liquid crystal paper. These electrodes are connected to interconnects 38, 40, respectively, (composed of nonconductive material 42 and conductive lead 44) for the purpose of electrically connecting the liquid crystal paper to a clearing device for erasing the paper for further use. The interconnects are made as part of the upper and lower substrates along with the electrodes on them. A preferred conductive material 34 and 36 is a conducting polymer (see for example Cao, *Appl Phy Lett* 60 (1992), which is incorporated herein by reference in its entirety). The cholesteric liquid crystal layer 28 in the form of the polymer network (including spacers) or the spacer network, and the backcoat 30 are the same as described in the embodiment above.

Figure 3:
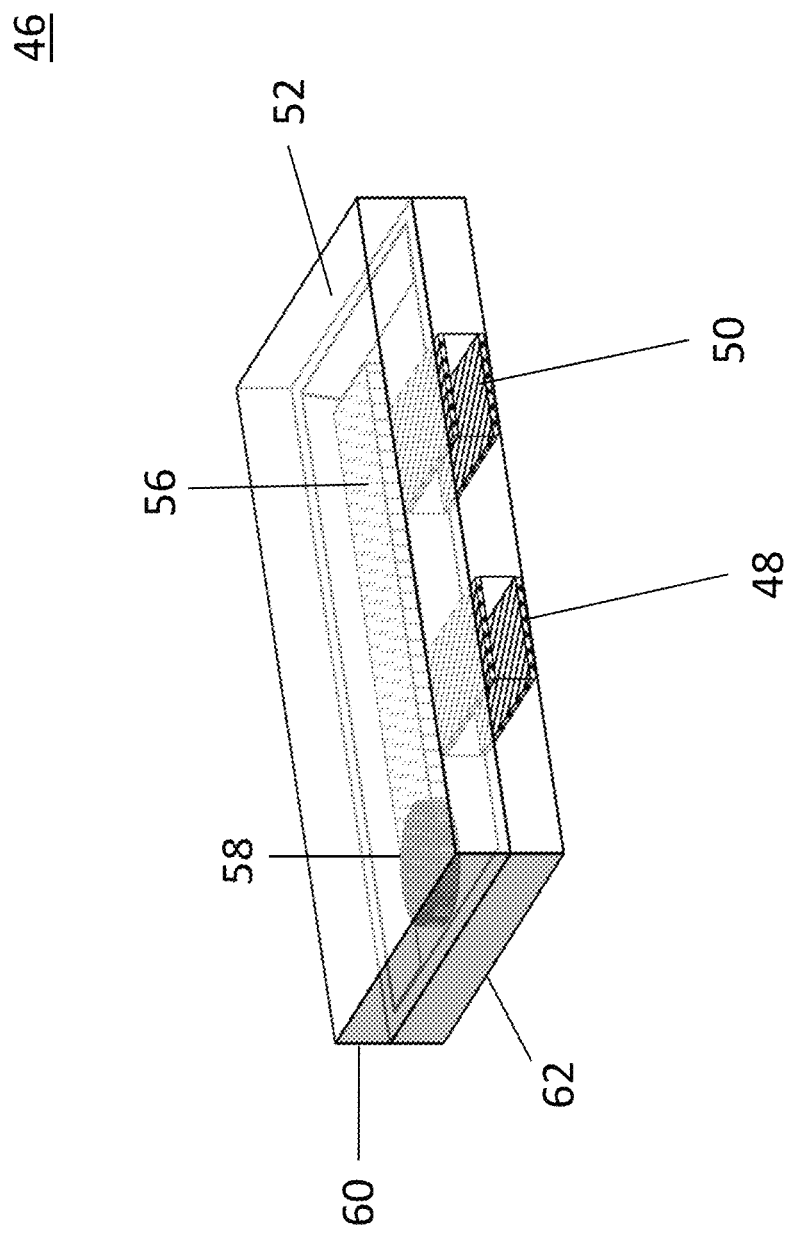
FIG. 3: Illustration of a clearing device for clearing liquid crystal paper with electrodes.

Liquid crystal paper 32 is cleared with the clearing or erasing device 46 as shown in FIG. 3. Interconnects 38 and 40 of the sheet of liquid crystal paper 32 are inserted into sockets 48 and 50 of the housing 52 of the erasing device 46 that are configured and arranged to receive the interconnects. Inside the sockets 48, 50 are electrically conductive contacts that are electrically connected inside the housing to erasing electronics 56, which are activated by button or switch 58. An upper housing section 60 and a lower housing section 62 encase the clearing device into a single unit. The clearing device 46 may be designed so that the button 58 or other switch of suitable structure is located internally and is activated by the liquid crystal paper when it is inserted.

Figure 4:
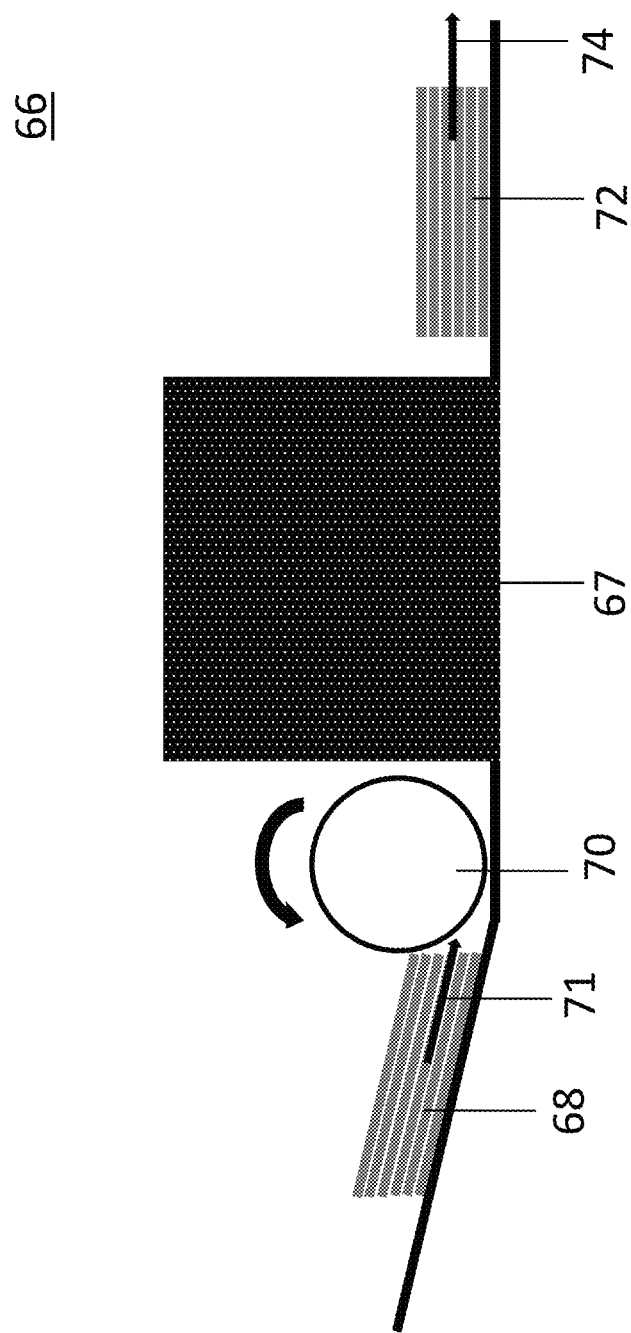
FIG. 4: Illustration of a device for clearing multiple sheets of liquid crystal paper.

In the case where there are a plurality of sheets 68 of the liquid crystal paper 10, 32 of either the first or the second embodiment to be cleared, such as for example a stack of sheets, using a device 66 the sheets 68 may all be cleared automatically as shown in FIG. 4. FIG. 4 shows how a stack of sheets 68 may be fed into a clearing or erasing device 67 using concepts of the first or second embodiments using a document feeder 70 and a collecting tray 72. After the sheets are moved one at a time in a direction 71 by the document feeder into the clearing device 67, the clearing device 67 either applies heat or a clearing voltage, which places the liquid crystal in the focal conic texture. The documents are moved in a direction 74 where they can then be stacked onto the collecting tray 72.

Figure 5:
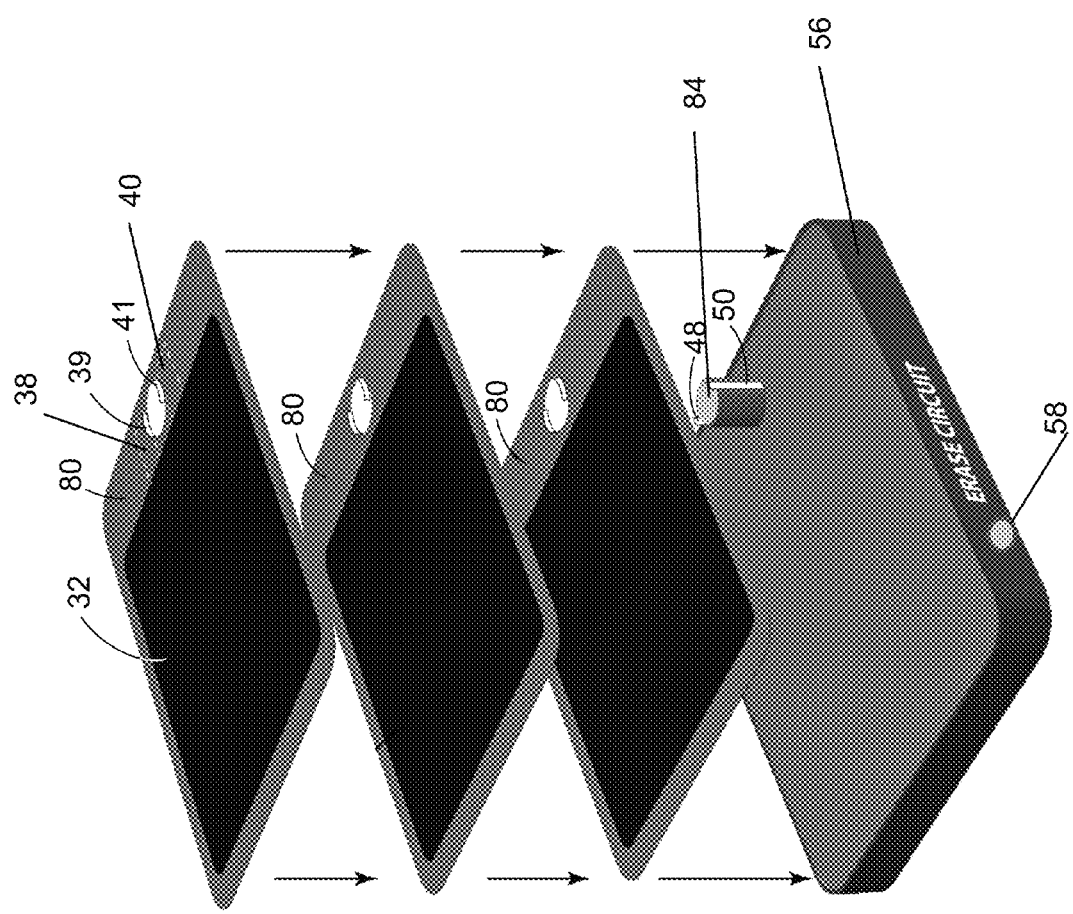
FIG. 5: Illustration of a device for storing and erasing a plurality of sheets of liquid crystal paper.

In another embodiment, sheets of liquid crystal paper as illustrated in FIG. 2 are configured to be placed or stored on a special receptacle that erases each sheet when placed on the receptacle. Such an example is shown in FIG. 5 where each sheet contains a hole that fits to a post on which each sheet can be placed and stored. The post contains an electrode that connects with the electrodes on each sheet to an erasing device to allow them to be erased either in mass or one at a time while they are placed on the post. This is illustrated in detail in FIG. 5 as an exploded view of several identical sheets of liquid crystal paper being placed over a post. Each sheet of liquid crystal paper includes an electrically erasable sheet 32 that is contained within a bezel 80. The bezel could be a clear flexible plastic material in which the sheet is partially or fully encapsulated Bezel 80 contains a hole and on the rim of the hole two electrically conductive electrodes 39 and 41 are electrically connected to interconnects 38 and 40 that are used to erase the sheet. The erasing device contains a post 84 which holds electrically conductive electrodes 48 and 50 and makes electrical contact with both rim electrodes 39 and 41 when the hole of the sheet is placed over the post 84. Electrodes 48 and 50 may be spring loaded so that they make firm electrical contact with interconnects 38 and 40. The sheet of liquid crystal paper is erased or cleared when voltage pulses of a suitable waveform are applied via the electrodes. The waveform is supplied by the erasing circuit 56 that is activated by the button switch 58. In the erasure process the liquid crystal is driven to the focal conic texture with a wave form such as described in U.S. Pat. Nos. 5,625,477 and 5,644,330, which are incorporated herein by reference in their entireties. The electronic erasing circuit that is able to produce these waveforms would be apparent to one of ordinary skill in the art in view of this disclosure, such as is disclosed in the 2009/0033811 publication.

The liquid crystal paper will now be described by reference to the following examples which should not be used to limit the invention as defined by the claims.

Example 1

Liquid crystal paper 32 (FIG. 2) and clearing device 46 (FIG. 3) were fabricated to demonstrate the inventive concept. The liquid crystal paper 32 was constructed from two transparent substrates and a polymer dispersed cholesteric liquid crystal layer. The top and bottom substrates were made from 2 mil (50 μm) thick Polyethylene Terephthalate (PET). An unpatterned transparent electrode made from PEDOT-based conducting polymer (AGFA) covered the entire surface area of the interior surface of both substrates. The polymer-dispersed liquid crystal layer consisted of a yellow (580 nm) cholesteric liquid crystal (Merck) with a layer thickness of 4.0 μm established by spherical spacers. The dispersion was made from a blend of polymerizable monomer (prepolymer) and cholesteric liquid crystal. The dispersion was created by non-encapsulating polymerization induced phase separation of a cholesteric liquid crystal using monomer chemistry similar to what is described in U.S. Pat. No. 7,351,506, which is incorporated herein by reference in its entirety. This layer was made using a UV curable methacrylate-based monomer, acrylate-based cross-linker, diphenyl photoinitiator, and 4 micron spherical polyvinylidine spacers. The mixture consisted of:

75% (wt.) KLC19 (Kent Displays, Inc.) cholesteric liquid crystal premixed to selectively Bragg reflect yellow light at the desired peak reflective wavelength of 580 nm; and 25% (wt.) photo-polymerizable monomer consisting of:
81.6% (wt.) methyl methacrylate
14.7% (wt.) trimethylolpropane triacrylate
2.0% (wt.) Irgacure 651 (Ciba Specialty Chemicals)
1.7% (wt.) lauryl methacrylate.

The spherical plastic spacers were added to the system at 3% (wt.) of the total weight of the liquid crystal/monomer mixture. The mixture was than laminated between the two conductive polymer coated PET substrates. The system was cured by exposure to UV light at 0.92 mW/cm$^2$ irradiance for 15 minutes. After curing the polymerizable mixture, the cell was backpainted black and then laser-singulated (as described in U.S. Patent Application Publication 2007/0277659A1, which is incorporated herein by reference in its entirety) to the desired shape.

A ruggedizing packaging was used to ruggedize the liquid crystal paper and protect it from extreme mechanical conditions. Ruggedized packaging consisted of a 1.5 mm black acrylic sheet behind the display and a 200 um black PET frame in front of the display. The black PET frame had 50 um pressure sensitive adhesive (3M) laminated to it allowing the frame to adhere to the display perimeter and the edge of the acrylic backplane. The acrylic backplane was 0.5 mm wider than the display in all dimensions and the PET frame. Exposed ledges with conducting polymer were connected to electrical interconnects that can be detachably connected to external electronics.

The electrical interconnects connected to the clearing device that electrically switches the liquid crystal paper. Electrical interconnects 38 and 40 on liquid crystal paper 32 were made with silver conductive tape attached to the display ledges and then left exposed on the outside of the ruggedizing packaging. The electrical interconnects were put into mechanical contact with the clearing device to make an electrical connection between the liquid crystal paper and the switching electronics in the clearing device, The clearing device was put in mechanical contact with the liquid crystal paper to electrically switch and clear off any writing on the liquid crystal paper (planar texture lines on a focal conic texture background). Clearing device 46 consisted of a pressure point to contact the electrical interconnect, and drive electronics. The drive electronics were similar to those described in U.S. patent application Ser. No. 12/152,862, which is incorporated herein by reference in its entirety and can electrically drive the liquid crystal paper to the focal conic texture to erase the images (i.e., to change the entire exposed surface area of the liquid crystal paper to the focal conic texture, which removes the planar texture lines).

When the liquid crystal paper was inserted into the clearing device it created a voltage sufficient to clear the liquid crystal paper so that it may be reused. The clearing voltage applied to the liquid crystal paper was a sequence of pulses. Since the voltage pulses were around 50V the circuit contained a voltage boost circuit to transform the given battery voltage to a higher voltage optimized for clearing the liquid crystal paper. To create the pulses, analog switches selected either high voltage or ground for each electrode 48 and 50. This selection was controlled by a microcontroller so that the analog switches can be switched in such a sequence to create the proper waveform. The waveform and magnitude of the voltage pulse to switch the display are well known in the art of a bistable cholesteric liquid crystal displays; e.g., U.S. Pat. Nos. 5,453,863 and 5,691,795, which patents are incorporated herein by reference in their entireties. Selecting the various waveforms and magnitudes of the clearing voltage for the liquid crystal layer would be apparent to one of ordinary skill in the art in view of these patents.

Example 2

The liquid crystal paper described in Example 1 was cleared by momentarily heating it to a temperature that erased the image on the paper. The liquid crystal paper sample was warmed with an air gun. After clearing one could then reuse the liquid crystal paper. It was observed that the contrast of the written image was not as good with the heat clearing process as with the electronic process of Example 1. It is speculated that the contrast could be improved by the selection of a polymer in the dispersion that provided an alignment layer that better created the nonreflective texture upon clearing. However, an alignment layer should not be considered a necessary part of the liquid crystal paper.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. Liquid crystal paper in combination with a separate erasing device for erasing the liquid crystal paper comprising:
    a sheet of liquid crystal paper comprising:
        flexible polymeric substrates,
        a bistable dispersion layer including a polymer network or spacer network in which cholesteric reflective liquid crystal material is dispersed, disposed between two of said substrates;
        electrically conductive layers that sandwich said dispersion layer therebetween;
        wherein application of pressure to an upper said substrate changes said focal conic nonreflective texture of said liquid crystal material to a reflective planar texture;
        wherein said liquid crystal paper is flexible and includes no casing that ruggedizes said liquid crystal paper;
        wherein a through hole is in said liquid crystal paper which internally exposes said electrically conductive layers; and
    an erasing device for erasing said liquid crystal paper that is not permanently connected to said liquid crystal paper, said erasing device including a source of voltage for erasing said liquid crystal paper by changing said reflective planar texture to said focal conic nonreflective texture;
    wherein said erasing device comprises a post and electrically conductive contacts disposed on said post that detachably connect with said exposed electrically conductive layers, wherein said drive electronics apply said voltage to said electrically conductive contacts for erasing said liquid crystal paper.

2. The liquid crystal paper and separate erasing device of claim 1 comprising a spring mechanism for outwardly urging said electrically conductive contacts.

3. The liquid crystal paper and separate erasing device of claim 1,
    wherein each of said substrates has a thickness of not more than 50 microns.

4. The liquid crystal paper and separate erasing device of claim 1 comprising a layer of light absorbing material disposed near one of said substrates.

5. The liquid crystal paper and separate erasing device of claim 4 wherein all of said substrates that are upstream of said light absorbing layer in a direction of incident light are transparent.

6. The liquid crystal paper and separate erasing device of claim 1 wherein said dispersion layer includes said polymer network in which said liquid crystal material is dispersed.

7. The liquid crystal paper and separate erasing device of claim 6 comprising at least two of said dispersion layers.

8. The liquid crystal paper and separate erasing device of claim 7 wherein each of said dispersion layers is sandwiched by said electrically conductive layers.

9. The liquid crystal paper and separate erasing device of claim 8 wherein at least one of said substrates is disposed between adjacent said electrically conductive layers.

10. The liquid crystal paper and separate erasing device of claim 6 wherein said dispersion layer has a thickness ranging from 2 to 10 microns.

11. The liquid crystal paper and separate erasing device of claim 3 wherein each said substrate has a thickness of at least 12.5 µm.

12. The liquid crystal paper and separate erasing device of claim 1 wherein application of pressure to said upper substrate creates gray scale caused by a presence of a combination of said focal conic nonreflective texture and said reflective planar texture.

13. The liquid crystal paper and separate erasing device of claim 1 comprising a stylus for applying said pressure that is untethered to said liquid crystal paper or to said erasing device, said stylus containing no lead or ink.

14. The liquid crystal paper and separate erasing device of claim 1 comprising a seal around a periphery of said liquid crystal paper formed by laser singulation.

15. The liquid crystal paper of claim 1 wherein said electrically conductive layers comprise unpatterned conductors.

16. Liquid crystal paper in combination with a separate erasing device for electrically erasing the liquid crystal paper comprising:
   a sheet of liquid crystal paper comprising:
      flexible polymeric substrates;
      a bistable dispersion layer including a polymer network or spacer network in which cholesteric reflective liquid crystal material is dispersed, disposed between two of said substrates;
      electrically conductive layers that sandwich said dispersion layer therebetween;
      a layer of light absorbing material disposed near one of said substrates;
      electrically conductive leads extending from said electrically conductive layers so as to be exposed exterior to said substrates;
      wherein application of pressure to an upper said substrate changes a focal conic nonreflective texture of said liquid crystal material to a reflective planar texture;
      wherein said liquid crystal paper is flexible; and
   an erasing device for erasing said liquid crystal paper that is not permanently connected to said liquid crystal paper, said erasing device comprising a housing including sockets including internal electrical contacts that detachably connect with said electrically conductive leads, and drive electronics that apply a voltage to said internal contacts for erasing said liquid crystal paper by changing said reflective planar texture to said focal conic nonreflective texture.

17. The liquid crystal paper and separate erasing device of claim 16 wherein all of said substrates that are upstream of said light absorbing layer in a direction of incident light are transparent.

18. The liquid crystal paper and separate erasing device of claim 16 wherein said dispersion layer includes said polymer network in which said liquid crystal material is dispersed.

19. The liquid crystal paper and separate erasing device of claim 18 comprising at least two of said dispersion layers.

20. The liquid crystal paper and separate erasing device of claim 19 wherein each of said dispersion layers is sandwiched by said electrically conductive layers.

21. The liquid crystal paper and separate erasing device of claim 20 wherein at least one of said substrates is disposed between adjacent said electrically conductive layers.

22. The liquid crystal paper and separate erasing device of claim 18 wherein said dispersion layer has a thickness ranging from 2 to 10 microns.

23. The liquid crystal paper and separate erasing device of claim 16 wherein each said substrate has a thickness up to 50 μm.

24. The liquid crystal paper and separate erasing device of claim 16 wherein said erasing device includes a switch enabling said voltage from said drive electronics to be applied to said contacts and to erase said liquid crystal paper.

25. The liquid crystal paper and separate erasing device of claim 16 wherein application of pressure to said upper substrate creates gray scale caused by a presence of a combination of said focal conic nonreflective texture and said reflective planar texture.

26. The liquid crystal paper and separate erasing device of claim 16 comprising a stylus for applying said pressure that is untethered to said liquid crystal paper or to said erasing device, said stylus containing no lead or ink.

27. The liquid crystal paper and separate erasing device of claim 16 comprising a seal around a periphery of said liquid crystal paper formed by laser singulation.

28. The liquid crystal paper and separate erasing device of claim 23 wherein each of said substrates has a thickness of at least 12.5 microns.

29. The liquid crystal paper of claim 16 wherein said electrically conductive layers comprise unpatterned conductors.

* * * * *